(12) United States Patent
Higashitani et al.

(10) Patent No.: US 9,180,789 B2
(45) Date of Patent: Nov. 10, 2015

(54) ELECTRIC VEHICLE

(71) Applicant: HONDA MOTOR CO., LTD., Tokyo (JP)

(72) Inventors: Kosuke Higashitani, Tochigi-ken (JP); Masanobu Asakawa, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/359,730

(22) PCT Filed: Nov. 14, 2012

(86) PCT No.: PCT/JP2012/079516
§ 371 (c)(1),
(2) Date: May 21, 2014

(87) PCT Pub. No.: WO2013/077233
PCT Pub. Date: May 30, 2013

(65) Prior Publication Data
US 2014/0309829 A1 Oct. 16, 2014

(30) Foreign Application Priority Data
Nov. 24, 2011 (JP) ................................. 2011-255870

(51) Int. Cl.
B60W 10/08 (2006.01)
B60W 20/00 (2006.01)
B60L 15/20 (2006.01)

(52) U.S. Cl.
CPC ............. *B60L 15/2045* (2013.01); *B60L 15/20* (2013.01); *B60L 2260/20* (2013.01); *B60W 10/08* (2013.01); *B60W 2710/086* (2013.01); *Y02T 10/7275* (2013.01)

(58) Field of Classification Search
CPC ..... B60W 10/04; B60W 10/08; B60W 20/00; B60W 20/108; B60L 15/00; B60L 15/2045
USPC .......... 701/22; 180/65.1, 65.21, 65.23, 65.26, 180/65.265, 65.275, 65.285, 65.31; 903/906, 930
See application file for complete search history.

(56) References Cited

U.S. PATENT DOCUMENTS 5,367,455 A 11/1994 Kitagawa et al.
5,964,313 A 10/1999 Guy (Continued)

FOREIGN PATENT DOCUMENTS

CN 101238006 A 8/2008
CN 102267458 A 12/2011

(Continued)

OTHER PUBLICATIONS

International Search Report dated Feb. 19, 2013 corresponding to International Patent Application No. PCT/JP2012/079516 and English Translation thereof.

(Continued)

*Primary Examiner* — Thomas Tarcza
*Assistant Examiner* — Tyler J Lee
(74) *Attorney, Agent, or Firm* — Squire Patton Boggs (US) LLP

(57) ABSTRACT

An electric vehicle is provided with a first operating mode having no limitation relating to power performance, or including a predetermined limitation on power performance, and a second operating mode in which power performance is more limited than in the first operating mode, and in which power consumption is reduced relative to the first operating mode. In the second operating mode, output limiting control is performed for limiting the output of an electric drive motor, a determination is made as to whether a limit discontinuation request has been inputted by the driver to an input device, and when a limit discontinuation request has been inputted from the driver to the input device during travel in the second operating mode, output limiting control is discontinued while the second operating mode is continued.

4 Claims, 10 Drawing Sheets

(56) References Cited

U.S. PATENT DOCUMENTS

| | | | |
|---|---|---|---|
| 6,792,344 B2* | 9/2004 | Minowa et al. | 701/96 |
| 8,093,843 B2* | 1/2012 | Okamura et al. | 318/139 |
| 8,103,406 B2* | 1/2012 | Aoki et al. | 701/36 |
| 8,204,639 B2* | 6/2012 | Jinno et al. | 701/22 |
| 8,781,665 B2* | 7/2014 | Yamamoto et al. | 701/22 |
| 2002/0079853 A1 | 6/2002 | Schmitz et al. | |
| 2007/0298928 A1 | 12/2007 | Yamanaka et al. | |
| 2008/0278302 A1 | 11/2008 | Palmer et al. | |
| 2009/0105895 A1 | 4/2009 | Shige | |
| 2009/0112383 A1 | 4/2009 | Lenart et al. | |
| 2009/0287366 A1* | 11/2009 | Davis et al. | 701/22 |
| 2009/0321165 A1 | 12/2009 | Haug | |
| 2010/0010697 A1 | 1/2010 | Soma et al. | |
| 2010/0052588 A1 | 3/2010 | Okamura et al. | |
| 2010/0082190 A1 | 4/2010 | Jinno et al. | |
| 2010/0161195 A1 | 6/2010 | Shin | |
| 2010/0305796 A1 | 12/2010 | Aoki et al. | |
| 2011/0307130 A1 | 12/2011 | Gow et al. | |

FOREIGN PATENT DOCUMENTS

| | | | |
|---|---|---|---|
| EP | 1 454 787 | A2 | 9/2004 |
| JP | 5-38003 | A | 2/1993 |
| JP | 06-121405 | A | 4/1994 |
| JP | 11-205914 | A | 7/1999 |
| JP | 11-227493 | A | 8/1999 |
| JP | 2001-161003 | A | 6/2001 |
| JP | 2006-321466 | A | 11/2006 |
| JP | 2007-230431 | A | 9/2007 |
| JP | 2007-302055 | A | 11/2007 |
| JP | 2008-174019 | A | 7/2008 |
| JP | 2008-259270 | A | 10/2008 |
| JP | 042-299005 | B2 | 7/2009 |
| JP | 2009-149116 | A | 7/2009 |
| JP | 04299005 | B2 | 7/2009 |
| JP | 2011-200056 | A | 10/2011 |

OTHER PUBLICATIONS

European Office Action application No. 11 839 495.6 dated Jun. 8, 2015.

* cited by examiner

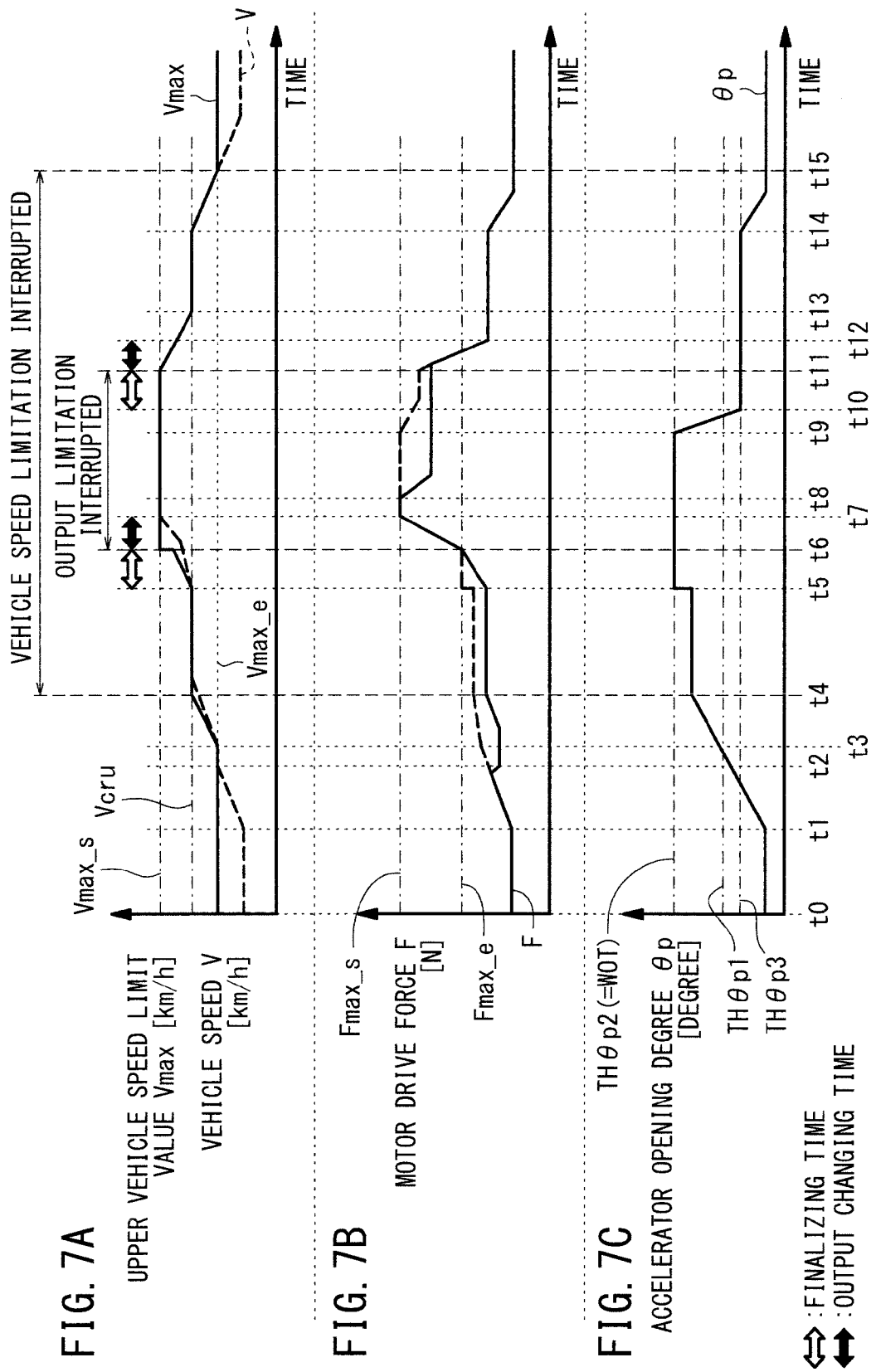

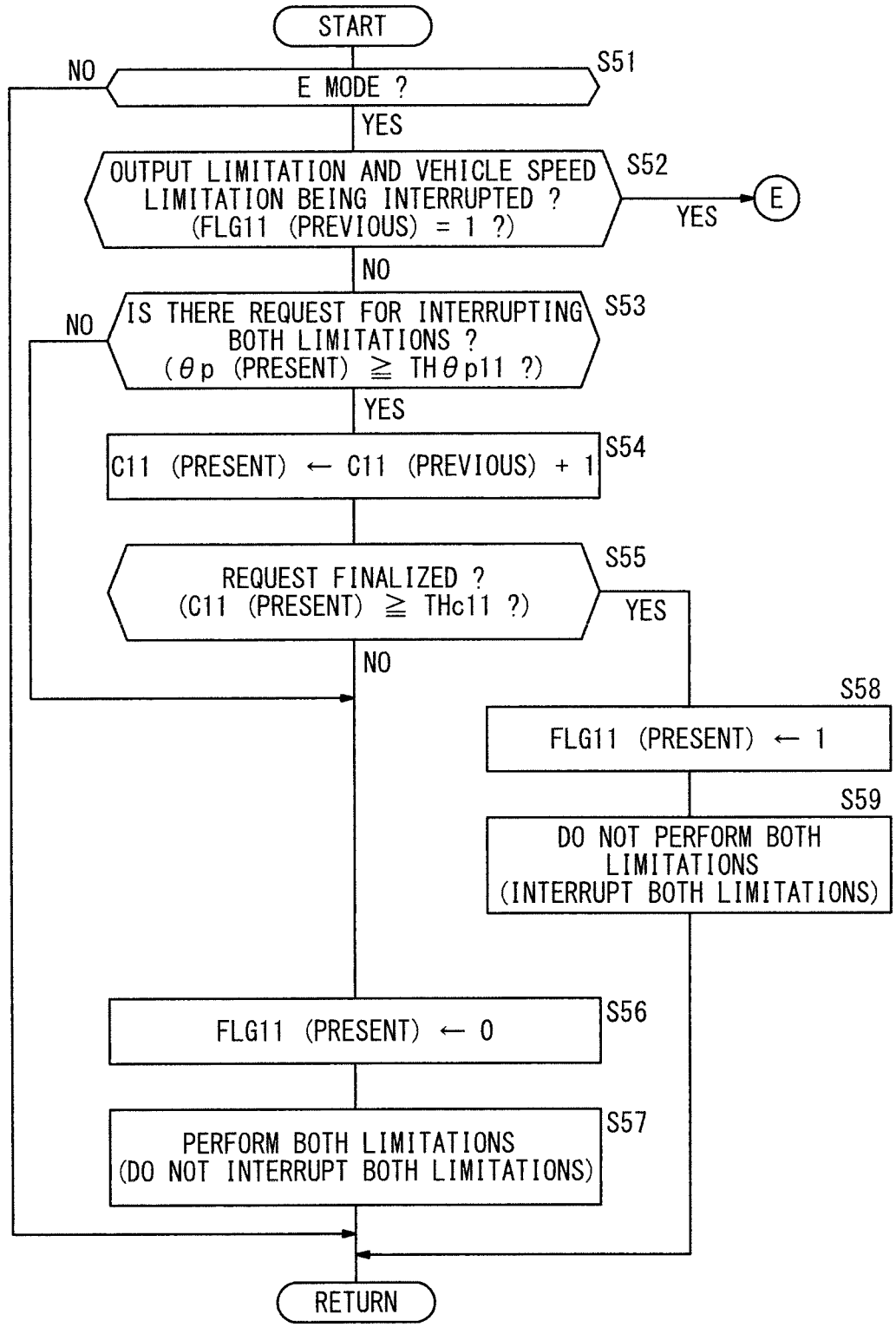

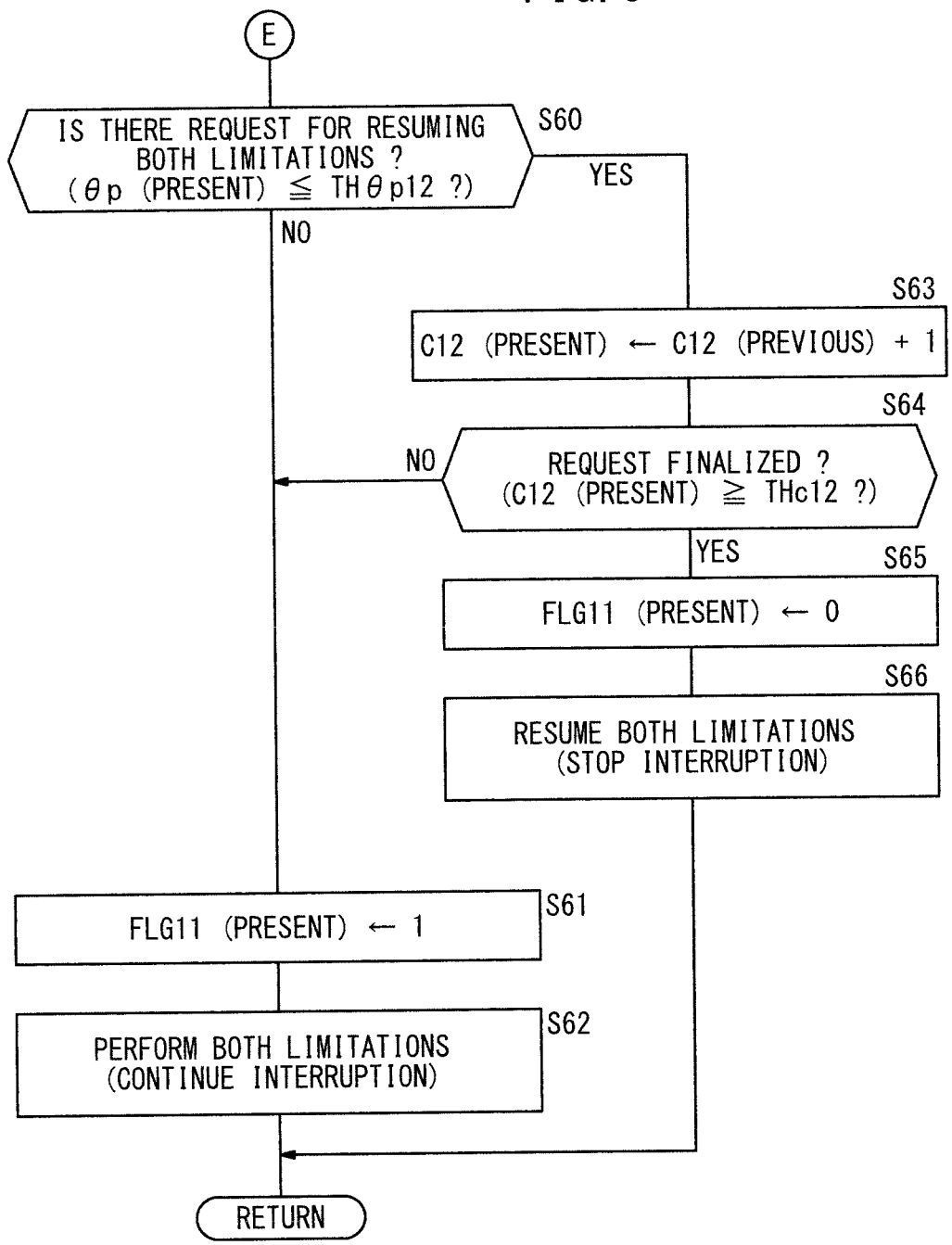

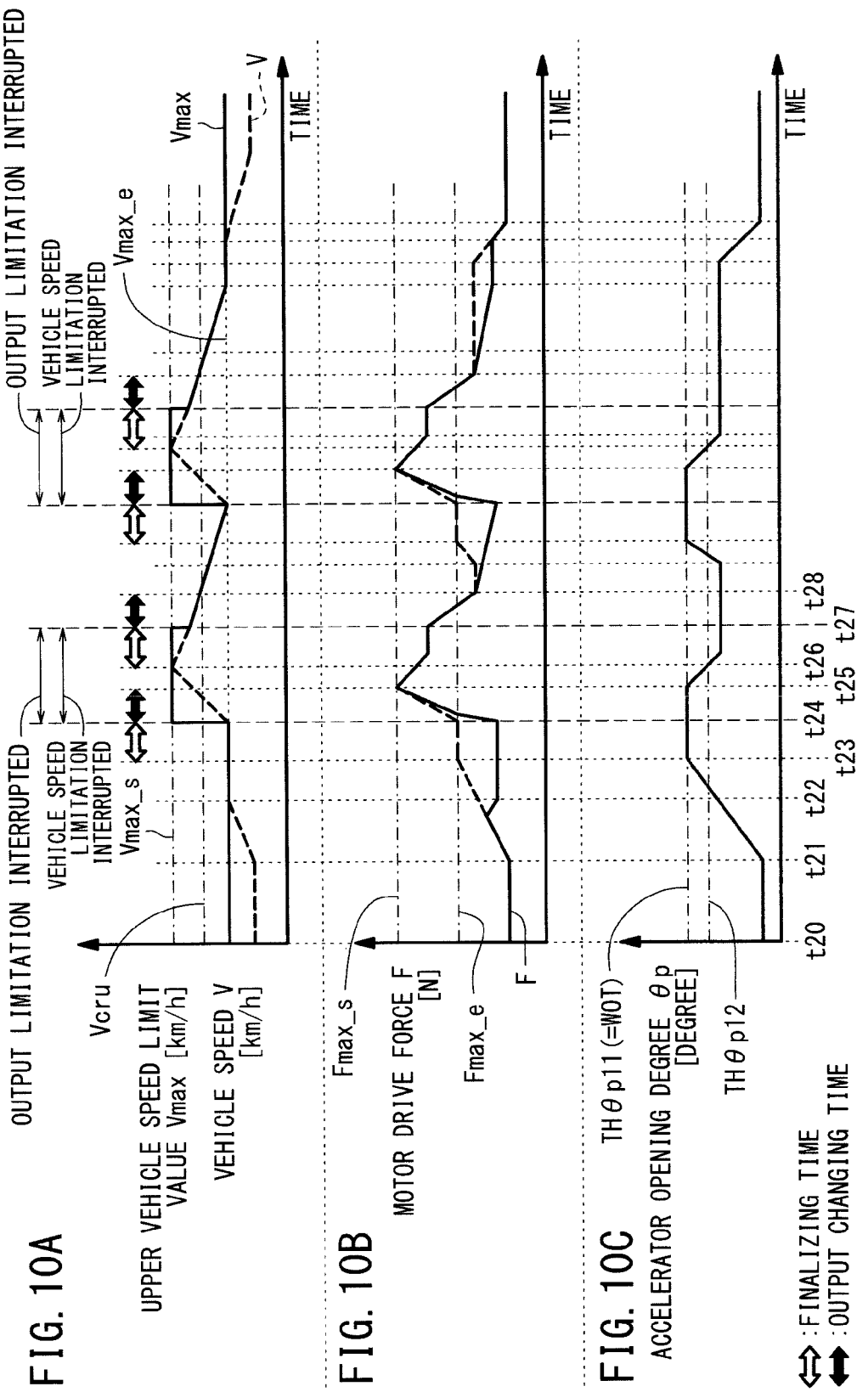

ELECTRIC VEHICLE

TECHNICAL FIELD

The present invention relates to an electric vehicle having a plurality of drive modes, such as a normal mode, an economy mode, etc. with respect to the power performance of the vehicle.

BACKGROUND ART

One technology that is concerned with electric vehicles is a technology for controlling a traction motor (electric motor) {see, for example, U.S. Pat. No. 5,367,455 (hereinafter referred to as "U.S. Pat. No. 5,367,455 A") and Japanese Laid-Open Patent Publication No. 06-121405 (hereinafter referred to as "JP 06-121405 A")}.

According to U.S. Pat. No. 5,367,455 A, the maximum speed of an electric automobile is limited on the basis of the running state, operating state, and remaining battery energy level of the vehicle (see column 6, line 17 through column 8, line 14, and FIGS. 2 through 10). Specifically, it is established whether the maximum speed or the acceleration or both are to be limited on the basis of the running state and the operating state or not (column 6, line 64 through column 7, line 7, FIG. 10). In addition, if the maximum speed is to be limited, then a maximum speed Vmax is set depending on the remaining battery energy level DOD {column 6, lines 29 through 35, FIG. 7(a)}. If the remaining battery energy level DOD drops to a preset value DOD' (S31 in FIG. 3: YES) and if the driver enters a signal indicating that the running performance is to be limited (S34: YES), then the maximum speed is limited depending on settings (after S39: YES) (column 7, line 44 through column 8, line 14).

According to JP 06-121405 A, there is disclosed an electric automobile that is capable of selecting a power mode with emphasis on the driving performance and an economy mode with emphasis on the highly efficient driving (see Abstract, [0006]). Specifically, in the power mode according to JP 06-121405 A, a field current is set depending on the rotational speed of an AC motor. In the economy mode, a field current is set depending on a torque command (see Abstract). The power mode and the economy mode are switched over using a mode switcher 13 ([0007]) or an automatic mode switcher 22 ([0012]).

If the mode switcher 13 is used, then a low-pass filter 20 is used in order to prevent a field current command from changing abruptly ([0010]). For switching from one driving mode to another, the automatic mode switcher 22 weights the economy mode and the power mode depending on an accelerator pedal depressed amount xa and a brake pedal depressed amount xb ([0012]). In addition, a membership function can be used for smoothly switching from one driving mode to another ([0012]).

It is customary to provide three or more driving modes {see, for example, Japanese Laid-Open Patent Publication No. 2007-302055 (hereinafter referred to as "JP 2007-302055 A")}.

SUMMARY OF INVENTION

According to U.S. Pat. No. 5,367,455 A, although a maximum vehicle speed (upper vehicle speed limit value) is set as a setting value, it is set in relation to the remaining battery energy level DOD {FIG. 7(a)}, and does not take into account a plurality of driving modes.

According to JP 06-121405 A, for example, in a case where the economy mode that is selected by the mode switcher 13 is switched temporarily to the power mode and then back to the economy mode, the driver has to operate the mode switcher 13 both for switching from the economy mode to the power mode and for switching from the power mode to the economy mode. When the automatic mode switcher 22 according to JP 06-121405 A is used, the processing burden tends to increase because the automatic mode switcher 22 weights the economy mode and the power mode depending on the accelerator pedal depressed amount xa and the brake pedal depressed amount xb at all times.

The present invention has been made in view of the above drawbacks. It is an object of the present invention to provide an electric vehicle which is capable of easily or suitably selecting one of a plurality of driving modes.

According to the present invention, there is provided an electric vehicle having a first driving mode for performing no limitation on the power performance of the electric vehicle or performing a predetermined limitation on the power performance and a second driving mode for performing a greater limitation on the power performance than the first driving mode thereby to make electric power consumption smaller than the first driving mode, the electric vehicle being characterized by performing an output limiting control process for limiting the output of a driving electric motor in the second driving mode, judging whether the driver of the electric vehicle enters a limitation interrupting request into an input device or not, and interrupting the output limiting control process while continuing the second driving mode if the driver enters the limitation interrupting request into the input device while the electric vehicle is being driven in the second driving mode.

According to the present invention, while the electric vehicle is being driven in the second driving mode with reduced electric power consumption, if the driver enters the limitation interrupting request, the output limiting control process is interrupted while the second driving mode is continued. Therefore, even if a request is made to interrupt the limitation of the output of the driving electric motor, it is possible to continue the second driving mode, but not to change to the first driving mode. Consequently, even if interruption of the limitation on the output of the motor becomes unnecessary after the request, it is not necessary to reset the driving mode to the second driving mode. As a result, it is possible for the driver to avoid the trouble of having to switch to the second driving mode again after the output limitation has been interrupted, compared with an arrangement, for example, wherein the driver manually switches from the second driving mode to the first driving mode and then manually switches from the first driving mode back to the second driving mode in response to a request for limiting the output.

Furthermore, it is possible to dispense with the control process for switching between the driving modes in response to the limitation on the output and to prevent the electric power consumption from increasing due to use of the first driving mode or to prevent the processing load from increasing due to the switching between the driving modes, etc., compared with an arrangement wherein the second driving mode is automatically switched to the first driving mode and then the first driving mode is automatically switched back to the second driving mode in response to a request for limiting the output.

The electric vehicle may perform a vehicle speed limiting control process for limiting the vehicle speed of the electric vehicle in addition to the output limiting control process in the second driving mode, and may interrupt both the output limiting control process and the vehicle speed limiting control process while continuing the second driving mode if the driver enters the limitation interrupting request into the input device while the electric vehicle is being driven in the second driving mode.

The electric vehicle may resume the output limiting control process while continuing to interrupt the vehicle speed limiting control process if the driver stops entering the limitation interrupting request into the input device in a case where both the output limiting control process and the vehicle speed limiting control process are being interrupted while continuing the second driving mode.

The electric vehicle may resume the vehicle speed limiting control process if the vehicle speed becomes equal to or smaller than an upper vehicle speed limit value of the second driving mode after having resumed the output limiting control process while continuing to interrupt the vehicle speed limiting control process, the upper vehicle speed limit value being used in the vehicle speed limiting control process.

The electric vehicle may interrupt the output limiting control process after having interrupted the vehicle speed limiting control process.

The electric vehicle may judge that the limitation interrupting request has been entered if an accelerator opening degree exceeds a preset output limitation interrupting threshold value.

BRIEF DESCRIPTION OF DRAWINGS

FIG. 7A is a timing chart showing by way of example a vehicle speed in a case where the motor output limiting control process and a vehicle speed limiting control process according to the embodiment are used;

FIG. 7B is a timing chart showing by way of example a motor drive force in a case where the motor output limiting control process and the vehicle speed limiting control process according to the embodiment are used;

FIG. 7C is a timing chart showing by way of example an accelerator opening degree in a case where the motor output limiting control process and the vehicle speed limiting control process according to the embodiment are used;

FIG. 8 is a first flowchart of a motor output limiting control process and a vehicle speed limiting control process according to a modification;

FIG. 9 is a second flowchart of the motor output limiting control process and the vehicle speed limiting control process according to the modification;

FIG. 10A is a timing chart showing by way of example a vehicle speed in a case where the motor output limiting control process and the vehicle speed limiting control process according to the modification are used;

FIG. 10B is a timing chart showing by way of example a motor drive force in a case where the motor output limiting control process and the vehicle speed limiting control process according to the modification are used; and FIG. 10C is a timing chart showing by way of example an accelerator opening degree in a case where the motor output limiting control process and the vehicle speed limiting control process according to the modification are used.

DESCRIPTION OF EMBODIMENTS

1. Description of Overall Configuration

[1-1. Overall Configuration]

Figure 1:
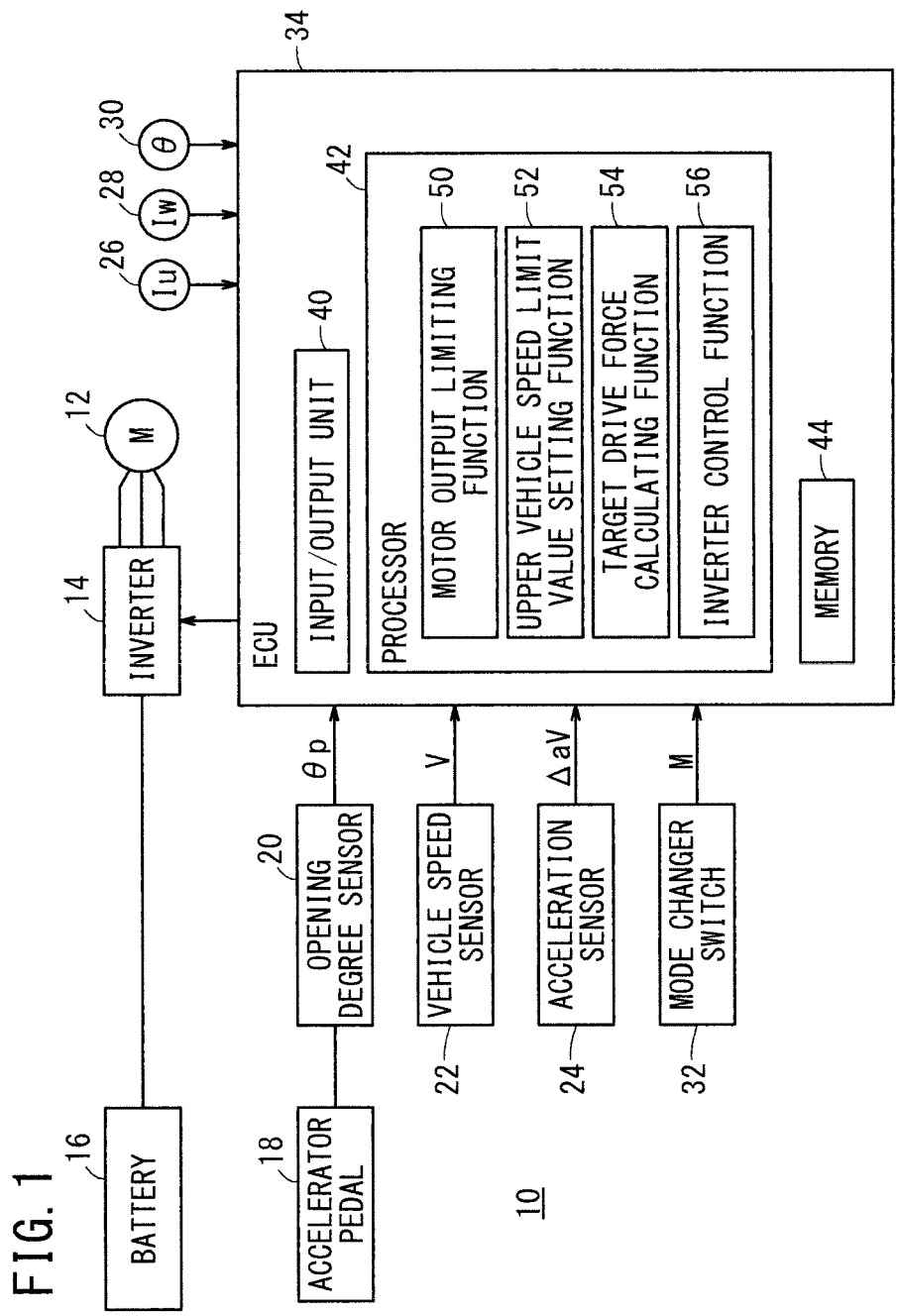
FIG. 1 is an overall schematic block diagram of an electric vehicle according to an embodiment of the present invention.

FIG. 1 is an overall schematic block diagram of an electric vehicle 10 according to an embodiment of the present invention. The electric vehicle 10 (hereinafter also referred to as "vehicle 10") has a traction motor 12 (hereinafter referred to as "motor 12"), an inverter 14, a battery 16, an accelerator pedal 18, an opening degree sensor 20, a vehicle speed sensor 22, an acceleration sensor 24, current sensors 26, 28, a resolver 30, a mode changer switch 32, and an electronic control unit 34 (hereinafter referred to as "ECU 34").

[1-2. Electric Power System]

The motor 12 is a three-phase AC brushless motor. The motor 12 generates a drive force (hereinafter referred to as "motor drive force F" or "drive force F") [N] (or a torque [N·m]) for the vehicle 10 based on electric power supplied from the battery 16 through the inverter 14. The motor 12 also generates electric power [W] by operating in a regenerative mode (hereinafter referred to as "regenerated electric power Preg") and supplies the regenerated electric power Preg to the battery 16, thereby charging the battery 16. The regenerated electric power Preg may be supplied to auxiliaries or the like, not shown.

The inverter 14, which is a three-phase bridge configuration, converts direct current into alternating current. The inverter 14 converts direct current into three-phase alternating current and supplies the three-phase alternating current to the motor 12. The inverter 14 also converts three-phase alternating current that is regenerated, into direct current, and supplies the direct current to the battery 16.

The battery 16 serves as an electric storage device (energy storage device) including a plurality of battery cells. The battery 16 may be a lithium ion secondary battery, a nickel hydrogen secondary battery, a capacitor, or the like. According to the present embodiment, the battery 16 is a lithium ion secondary battery. A DC/DC converter, not shown, may be connected between the inverter 14 and the battery 16, for stepping up or down the output voltage of the battery 16 or the output voltage of the motor 12.

[1-3. Various Sensors]

The opening degree sensor 20 detects a depressed amount of the accelerator pedal 18 from its home position, i.e., an accelerator opening degree $\theta p$) [°], and supplies the detected accelerator opening degree $\theta p$ to the ECU 34. The vehicle speed sensor 22 detects an actual vehicle speed V [km/h] of the vehicle 10, and supplies the detected actual vehicle speed V to the ECU 34. The acceleration sensor detects an acceleration $\Delta aV$ [km/h] of the vehicle 10, and supplies the detected acceleration $\Delta aV$ to the ECU 34.

The current sensor 26 detects a current in the U phase of the motor 12, i.e., a U-phase current Iu, and supplies the detected U-phase current Iu to the ECU 34. The current sensor 28 detects a current in the W phase of the motor 12, i.e., a W-phase current Iw, and supplies the detected W-phase current Iw to the ECU 34. The current sensors 26, 28 may detect currents in a combination of phases other than the combination of the U, W phases insofar as they detect currents in two of the three phases of the motor 12. Alternatively, another current sensor for detecting a current in the V phase, i.e., a V-phase current Iv, and supplying the detected V-phase current Iv to the ECU 34, may be added to the current sensors 26, 28.

The resolver 30 detects an electric angle θ which represents the rotation angle of the output shaft or outer rotor, not shown, of the motor 12, i.e., the rotation angle thereof in a coordinate system that is fixed to a stator, not shown, of the motor 12, and supplies the detected electric angle θ to the ECU 34.

[1-4. Mode Changer Switch 32]

The mode changer switch 32 is capable of switching between driving modes of the vehicle 10, i.e., a normal mode (hereinafter referred to as "N mode"), an economy mode (hereinafter referred to as "E mode"), and a sport mode (hereinafter referred to as "S mode"). The mode changer switch 32 notifies the ECU 34 of the selected driving mode.

The N mode is a standard driving mode in which an upper vehicle speed limit value (hereinafter referred to as "N mode upper limit value Vmax_n") [km/h] is set as an upper limit value (setting value) for the vehicle speed V.

The E mode is a driving mode which gives preference to the electric mileage in comparison with the N mode and the S mode. However, the E mode is poorer than the N mode and the S mode with respect to the output responsiveness of the vehicle 10. The electric mileage represents a traveled distance per unit electric power consumption [km/kWh], which is essentially equivalent to an electric power consumption per traveled distance [kWh/km]. In the E mode, an upper vehicle speed limit value (hereinafter referred to as "E mode upper limit value Vmax_e") [km/h] is set as an upper limit value (setting value) for the vehicle speed V. The E mode upper limit value Vmax_e is lower than the N mode upper limit value Vmax_n and an upper vehicle speed limit value in the S mode (hereinafter referred to as "S mode upper limit value Vmax_s") (Vmax_e<Vmax_n<Vmax_s).

In the E mode, other settings can be changed compared with the N mode and the S mode. For example, as disclosed in JP 2007-302055 A, it is possible to change settings for the damping force of a variable-damping-force damper, the level of intervention of a yaw control process based on the distribution of braking forces on front right, front left, rear right, and rear left road wheels, the steering reactive force of the electrically-assisted power steering, the control of a four-wheel-drive mechanism which can distribute torques to front right, front left, rear right, and rear left road wheels, the control of a transmission, and the control of a fuel injection/drive by wire (FI/DBW) device (see Table 1 in paragraph [0016]).

The S mode is a driving mode which gives preference to the output responsiveness of the vehicle 10 in comparison with the N mode and the E mode. However, the S mode is poorer than the N mode and the E mode with respect to the electric mileage. In the S mode, the S mode upper limit value Vmax_s is set as an upper limit value (setting value) for the vehicle speed V. The S mode upper limit value Vmax_s is higher than the N mode upper limit value Vmax_n and the E mode upper limit value Vmax_e (Vmax_s>Vmax_n>Vmax_e). No numerical value may be set as the S mode upper limit value Vmax_s, i.e., no upper limit value for the vehicle speed V may be set in the S mode. In the S mode, other settings can be changed compared with the N mode and the E mode. For example, as is the case with the E mode, it is possible to change settings as disclosed in JP 2007-302055 A (see Table 1 in paragraph [0016]).

Upper vehicle speed limit values that are set for the vehicle 10 will hereinafter be referred to as "upper vehicle speed limit values Vmax" [km/h]. The upper vehicle speed limit values Vmax include the upper limit values Vmax_n, Vmax_e, Vmax_s, and other values may be set as upper vehicle speed limit values Vmax.

[1-5. ECU 34]

The ECU 34 controls the inverter 14 based on output signals from the various sensors and the mode changer switch 32 for thereby controlling the output of the motor (electric motor power). As shown in FIG. 1, the ECU 34 includes an input/output unit 40, a processor 42, and a memory 44.

According to the present embodiment, the processor 42 has a motor output limiting function 50 for performing a motor output limiting control process for managing the limitation on the output of the motor 12, an upper vehicle speed limit value setting function 52 for performing a vehicle speed limiting control process for setting an upper vehicle speed limit value Vmax and limiting the vehicle speed V, a target drive force calculating function 54 for calculating a target value [N] for the motor drive force F (hereinafter referred to as "target drive force Ftar"), and an inverter control function 56 for controlling the inverter 14 based on the target drive force Ftar or a target torque based on the target drive force Ftar.

The memory 44 stores software executed by the processor 42 and various data used thereby, and includes a nonvolatile memory and a volatile memory.

2. Control Processes According to the Embodiment

Various control processes (including a motor output limiting control process and an upper vehicle speed limit value setting control process) according to the present embodiment will be described below. Values acquired or calculated in a present processing cycle will be accompanied by the word "(present)", and values acquired or calculated in a previous processing cycle will be accompanied by the word "(previous)", so that they will be distinguished from each other. When necessary, corresponding items on timing charts shown in FIGS. 7A through 7C will be referred to.

[2-1. Motor Output Limiting Control Process]

The motor output limiting function 50 manages the limitation on the output of the motor 12 depending on a selected driving mode (hereinafter referred to as "driving mode M"), etc. According to the present embodiment, when the driving mode M is the E mode, the motor output limiting function 50 limits the output of the motor 12, thereby reducing the electric power consumed by the motor 12 for driving the vehicle 10 efficiently. The motor output limiting function 50 may limit the output of the motor 12 in the N mode or in the N and S modes. However, it is preferable that the limitation on the output of the motor 12 in the E mode be the greatest and the limitation in the S mode be the smallest (including no limitation).

Figure 2:
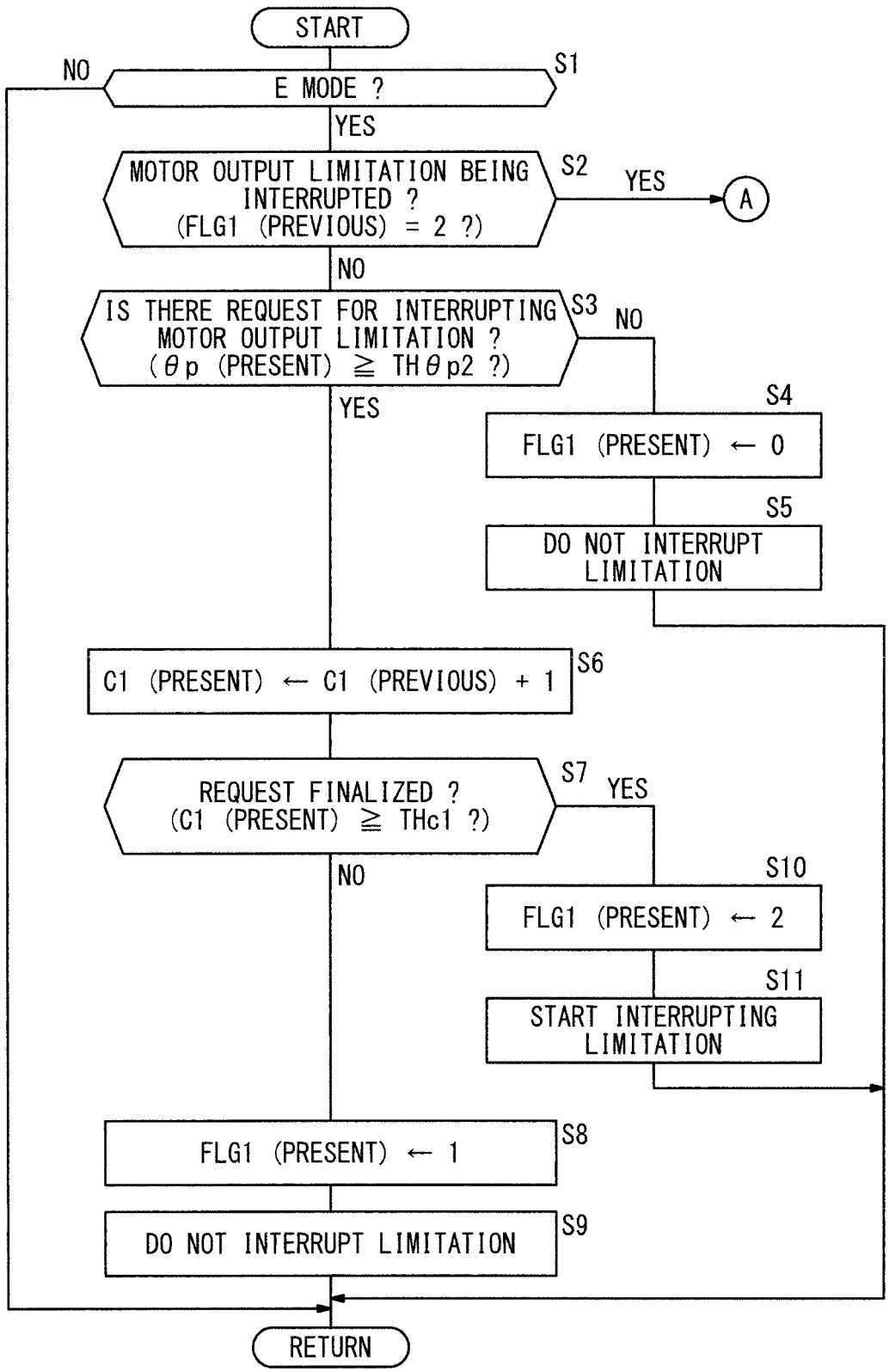
FIG. 2 is a first flowchart of a motor output limiting control process according to the embodiment.
Figure 3:
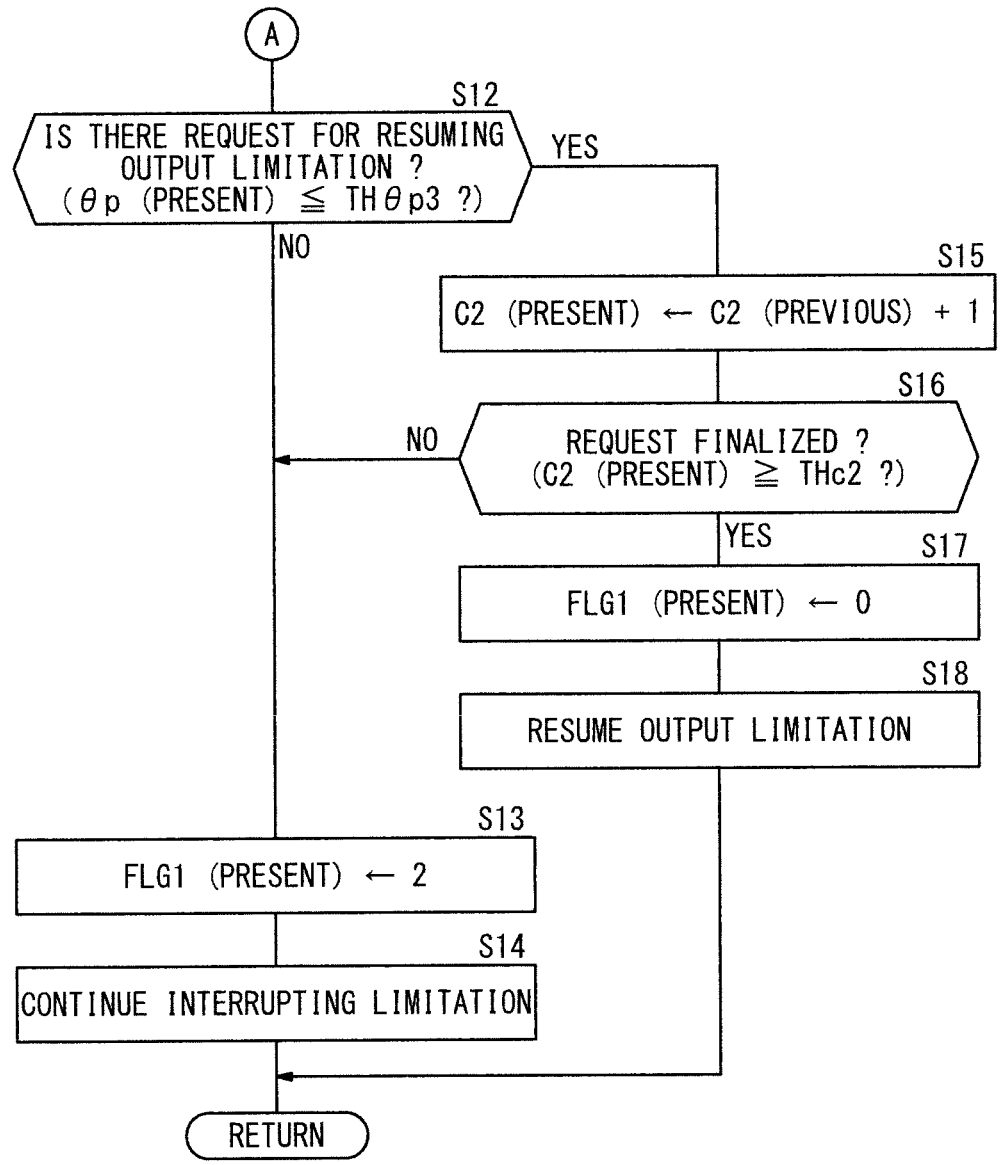
FIG. 3 is a second flowchart of the motor output limiting control process according to the embodiment.

FIGS. 2 and 3 are first and second flowcharts of the motor output limiting control process according to the embodiment. The processing sequence of the motor output limiting control process will be described below with reference to FIGS. 2 and 3 together with FIGS. 7A through 7C.

In step S1 in FIG. 2, the ECU 34 judges whether the driving mode M is the E mode or not based on an output signal from the mode changer switch 32. If the driving mode M is not the E mode (S1: NO), then the sequence of the present processing cycle is ended. In other words, if the driving mode M is the N mode or the S mode, then a higher upper limit value than the upper limit value for the motor drive force F in the E mode (hereinafter referred to as "E mode upper limit value Fmax_e") is used.

If the driving mode M is the E mode (S1: YES), then the ECU 34 judges in step S2 whether the limitation on the output of the motor 12 is being interrupted or not by judging whether a flag FLG1 (previous) in the previous processing cycle is "2" or not. The flag FLG1 represents a performance state of the limitation on the output of the motor 12 in the E mode. If the flag FLG1 is "0", then it indicates that the limitation on the output of the motor 12 is not being interrupted. If the flag FLG1 is "1", then it indicates that the limitation on the output of the motor 12 is not being interrupted though the processing is on its way to interrupting the limitation on the output of the motor 12. If the flag FLG1 is "2", then it indicates that the limitation on the output of the motor 12 is being interrupted. The flag FLG1 is used not only in the motor output limiting control process, but also in the upper vehicle speed limit value setting control process to be described later.

If the flag FLG1 (previous) is not "2" in step S2 and the limitation on the output of the motor 12 is not being interrupted (S2: NO), then the ECU 34 judges whether there is a request from the driver of the vehicle 10 for interrupting the limitation on the output of the motor 12 or not in step S3. Specifically, the ECU 34 judges whether or not the accelerator opening degree θp (present) is equal to or greater than a threshold value for judging whether there is a request for interrupting the limitation on the output of the motor 12 or not (hereinafter referred to as "output limitation interrupting threshold value THθp2" or "threshold value THθp2"). In the present embodiment, the threshold value THθp2 represents a fully-open throttle state (WOT: Wide Open Throttle).

If the accelerator opening degree θp (present) is not equal to or greater than the threshold value THθp2 (S3: NO), then the accelerator pedal 18 is not depressed to the fully-open throttle state, and there is not given a request for interrupting the limitation on the output of the motor 12. In this case, in step S4, the ECU 34 sets the flag FLG1 (present) to "0". In step S5, the ECU 34 does not interrupt the limitation on the output of the motor 12, but continues to limit the output of the motor 12. As a result, when the target drive force calculating function 54 calculates a target drive force Ftar for the motor 12, it calculates a target drive force Ftar so as to be equal to or smaller than the upper limit value for the motor drive force F in the E mode (E mode upper limit value Fmax_e).

Returning to step S3, if the accelerator opening degree θp is equal to or greater than the threshold value THθp2 (see time t5 in FIG. 7C) and there is given a request for interrupting the limitation on the output of the motor (S3: YES), then the ECU 34 sets the sum of a count value C1 (previous) and 1 as a count value C1 (present) in step S6. The count value C1 is a value for judging the finalization of the interrupting request. In step S7, the ECU 34 judges whether the interrupting request is finalized or not based on whether or not the count value C1 (present) is equal to or greater than a threshold value for finalizing the interrupting request (hereinafter referred to as "interruption judging threshold value THc1" or "threshold value THc1").

If the count value C1 (present) is not equal to or greater than the threshold value THc1 and the interrupting request is not finalized (S7: NO), then the ECU 34 sets the flag FLG1 (present) to 1 in step S8. In step S9, the ECU 34 continues to limit the output of the motor 12 and does not interrupt the limitation on the output of the motor 12. As a result, when the target drive force calculating function 54 calculates a target drive force Ftar, it calculates a target drive force Ftar so as to be equal to or smaller than the E mode upper limit value Fmax_e.

If the count value C1 (present) is equal to or greater than the threshold value THc1 and the interrupting request is finalized (S7: YES), then the ECU 34 sets the flag FLG1 to 2 in step S10. In step S11, the ECU 34 interrupts the limitation on the output of the motor 12. As a result, when the target drive force calculating function 54 calculates a target drive force Ftar, it is permitted to calculate a target drive force Ftar so as to exceed the E mode upper limit value Fmax_e (see times t6 through t11 in FIG. 7B). For example, a target drive force Ftar can be set to an S mode upper limit value Fmax_s.

Referring back to step S2 in FIG. 2, if the flag FLG1 (previous) is "2" and the limitation on the output of the motor 12 is being interrupted (S2: YES), then control goes to step S12 in FIG. 3.

In step S12 in FIG. 3, the ECU 34 judges whether there is a request from the driver for resuming the limitation on the output of the motor 12 or not. Specifically, the ECU 34 judges whether or not the accelerator opening degree θp (present) is equal to or greater than a threshold value for judging whether there is a request for resuming the limitation on the output of the motor 12 or not (hereinafter referred to as "output limitation resuming threshold value THθp3" or "threshold value THθp3").

If the accelerator opening degree θp (present) is not equal to or smaller than the threshold value THθp3 (S12: NO), then the accelerator pedal 18 still remains depressed and hence there is not given a request for resuming the limitation on the output of the motor 12. In this case, in step S13, the ECU 34 sets the flag FLG1 (present) to "2". In step S14, the ECU 34 continues to interrupt the limitation on the output of the motor 12. As a consequence, the target drive force calculating function 54 is permitted to calculate a target drive force Ftar in excess of the E mode upper limit value Fmax_e.

Referring back to step S12, if the accelerator opening degree θp (present) is equal to or smaller than the threshold value THθp3 (see times t9 through t10 in FIG. 7C) and there is given a request for resuming the limitation on the output of the motor 12 (S12: YES), then the ECU 34 sets the sum of a count value C2 (previous) and 1 as a count value C2 (present) in step S15. The count value C2 is a value for judging the finalization of the resuming request. In step S16, the ECU 34 judges whether the resuming request is finalized or not based on whether or not the count value C2 (present) is equal to or greater than a threshold value for finalizing the resuming request (hereinafter referred to as "resuming judging threshold value THc2" or "threshold value THc2").

If the count value C2 (present) is not equal to or greater than the threshold value THc2 and the resuming request is not finalized (S16: NO), then control goes to step S13 and the ECU 34 carries out steps S13, S14 as described above.

If the count value C2 (present) is equal to or greater than the threshold value THc2 and the resuming request is finalized (S16: YES), then the ECU 34 sets the flag FLG1 to "0" in step S17. In step S18, the ECU 34 resumes the limitation on the output of the motor 12. As a consequence, the target drive force calculating function 54 gradually reduces the target drive force Ftar to the E mode upper limit value Fmax_e or less (see times t11 through t12 in FIG. 7B).

[2-2. Setting of Upper Vehicle Speed Limit Value Vmax (Vehicle Speed Limiting Control Process)]

The upper vehicle speed limit value setting function 52 sets an upper vehicle speed limit value Vmax depending on the selected driving mode M, the accelerator opening degree θp (present), etc. Owing to the set upper vehicle speed limit value Vmax, the vehicle speed V cannot exceed the upper vehicle speed limit value Vmax even when the driver depresses the accelerator pedal 18, and the vehicle 10 is able to travel at the vehicle speed V that is equal to the upper vehicle speed limit value Vmax, i.e., the vehicle 10 is able to cruise.

According to the present embodiment, the upper vehicle speed limit value Vmax (E mode upper limit value Vmax_e) that is normally used when the driving mode M is the E mode is set, and a control process for limiting the vehicle speed V in the E mode, i.e., a vehicle speed limiting control process, is carried out. However, if the driver wants to increase the vehicle speed V temporarily, then the driver can depress the accelerator pedal 18 to interrupt the vehicle speed limiting control process, and set an upper vehicle speed limit value Vmax in excess of the E mode upper limit value Vmax_e, after which the vehicle speed limiting control process can be resumed depending on the driver's intention to decelerate the vehicle 10.

Figure 4:
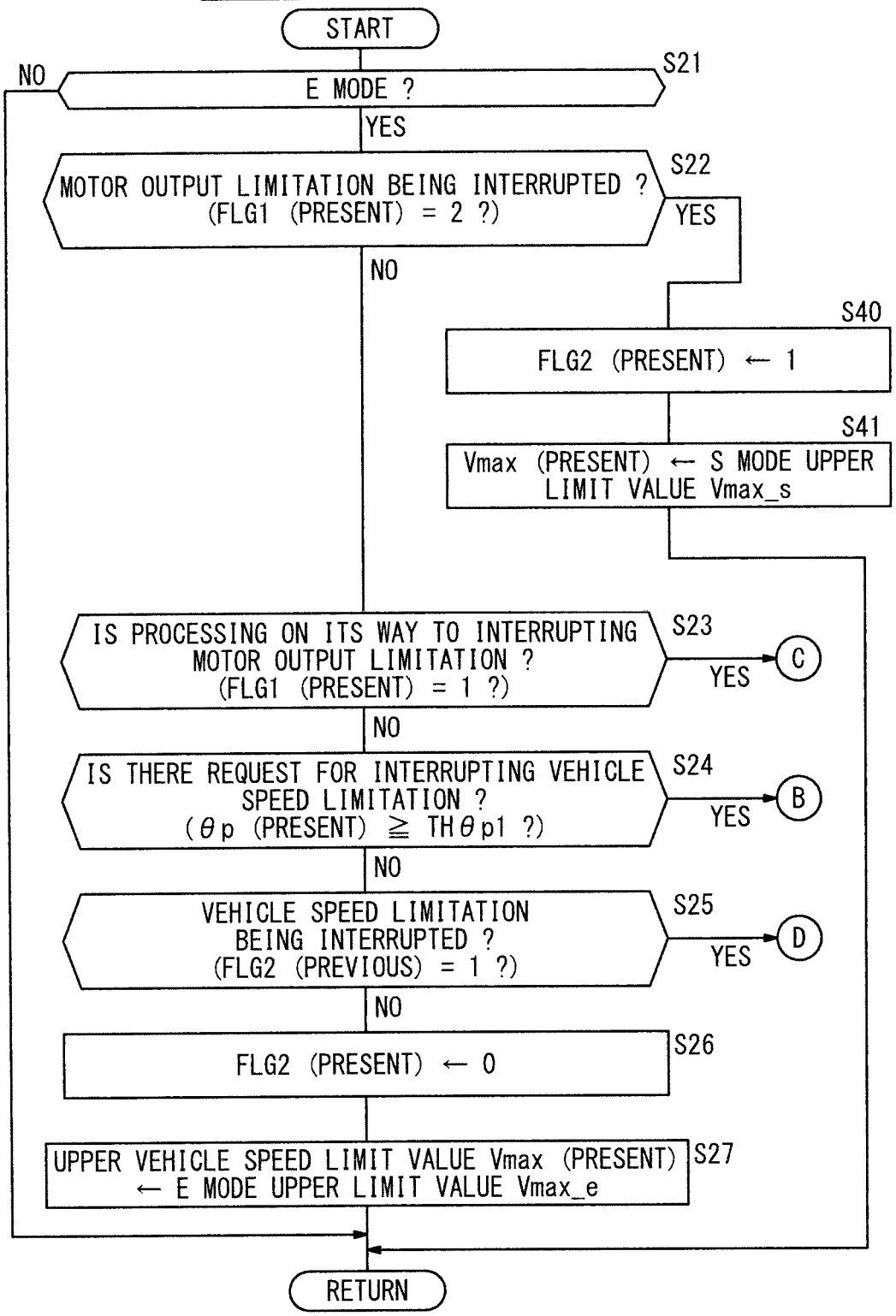
FIG. 4 is a first flowchart of an upper vehicle speed limit value setting control process according to the embodiment.
Figure 5:
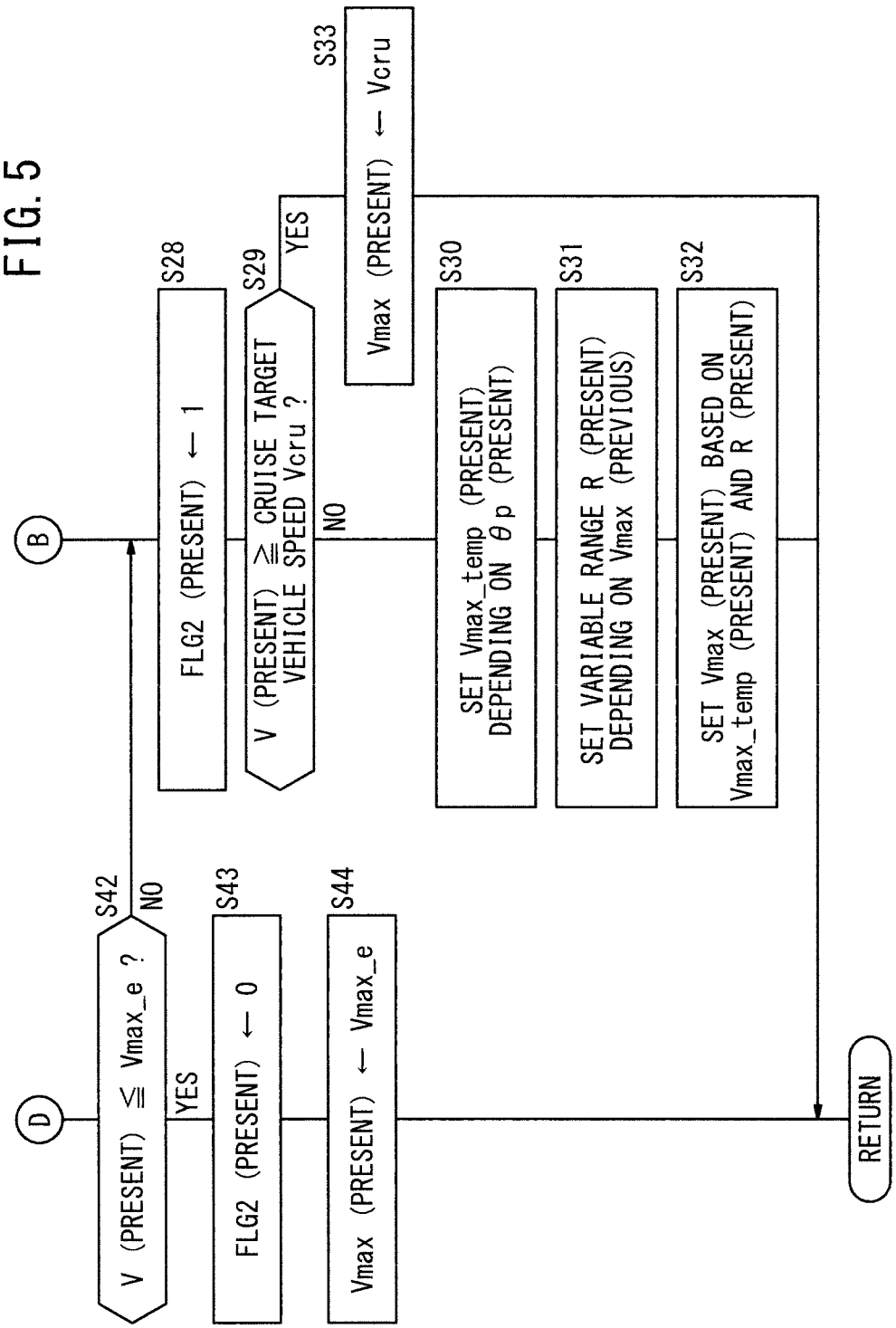
FIG. 5 is a second flowchart of the upper vehicle speed limit value setting control process according to the embodiment.
Figure 6:
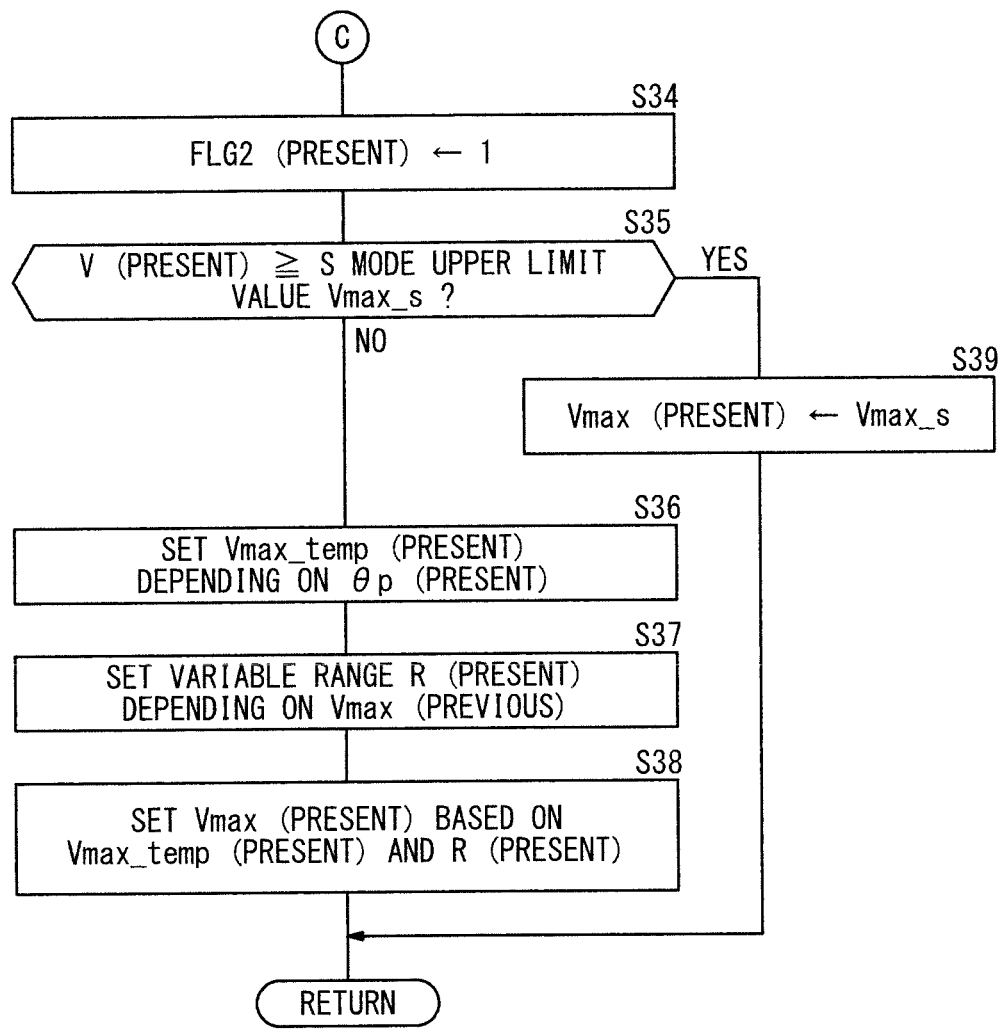
FIG. 6 is a third flowchart of the upper vehicle speed limit value setting control process according to the embodiment.

FIGS. 4 through 6 are first through third flowcharts, respectively, of the upper vehicle speed limit value setting control process. The upper vehicle speed limit value setting control process is used, as part of the vehicle speed limiting control process, for setting an upper vehicle speed limit value Vmax. In step S21, the ECU 34 judges whether the driving mode M is the E mode or not based on an output signal from the mode changer switch 32. If the driving mode M is not the E mode (S21: NO), then the sequence of the present processing cycle is ended. In other words, if the driving mode M is the N mode or the S mode, then an upper vehicle speed limit value Vmax is set according to a process other than the upper vehicle speed limit value setting control process shown in FIGS. 4 through 6.

If the driving mode M is the E mode (S21: YES), then the ECU 34 judges in step S22 whether the limitation on the output of the motor 12 is being interrupted or not by judging whether a flag FLG1 (present) in the present processing cycle is "2" or not. As described above, the flag FLG1 is set in the motor output limiting control process, and represents the performance state of the limitation on the output of the motor 12 in the E mode. If the flag FLG1 is "0", then it indicates that the limitation on the output of the motor 12 is not being interrupted. If the flag FLG1 is "1", then it indicates that the limitation on the output of the motor 12 is not being interrupted though the processing is on its way to interrupting the limitation on the output of the motor 12. If the flag FLG1 is "2", then it indicates that the limitation on the output of the motor 12 is being interrupted.

In step S22, if the flag FLG1 (present) is not "2" and the limitation on the output of the motor 12 is not being interrupted (S22: NO), then the ECU 34 judges in step S23 whether the processing is on its way to interrupting the limitation on the output of the motor 12 or not by judging whether the flag FLG1 (present) in the present processing cycle is "1" or not.

If the flag FLG1 is not "1" and the processing is not on its way to interrupting the limitation on the output of the motor 12 (S23: NO), then the ECU 34 judges whether there is a request from the driver of the vehicle 10 for interrupting the limitation on the vehicle speed or not in step S24. Specifically, the ECU 34 judges whether or not the accelerator opening degree $\theta p$ (present) is equal to or greater than a threshold value for judging whether there is a request for interrupting the limitation on the vehicle speed or not (hereinafter referred to as "vehicle speed limitation interrupting threshold value TH$\theta$p1" or "threshold value TH$\theta$p1"). According to the present embodiment, the threshold value TH$\theta$p1 is greater than the output limitation resuming threshold value TH$\theta$p3 and smaller than the output limitation interrupting threshold value TH$\theta$p2 (see FIG. 7C).

If the accelerator opening degree $\theta p$ (present) is not equal to or greater than the threshold value TH$\theta$p1 and there is not a request for interrupting the limitation on the vehicle speed (S24: NO), then the ECU 34 judges in step S25 whether the limitation on the vehicle speed is being interrupted or not by judging whether a flag FLG2 (previous) in the previous processing cycle is "1" or not. The flag FLG2 represents a performance state of the limitation on the vehicle speed in the E mode. If the flag FLG2 is "0", then it indicates that the limitation on the vehicle speed is not being interrupted, and if the flag FLG2 is "1", then it indicates that the limitation on the vehicle speed is being interrupted.

If the flag FLG2 is not "1" and the limitation on the vehicle speed is not being interrupted (S25: NO), then the ECU 34 sets a flag FLG2 (present) to "0" in step S26. In step S27, the ECU 34 sets the E mode upper limit value Vmax_e as an upper vehicle speed limit value Vmax (present).

In step S24, if the accelerator opening degree $\theta p$ (present) is equal to or greater than the threshold value TH$\theta$p1 (time t3 in FIG. 7C) and there is a request for interrupting the limitation on the vehicle speed (S24: YES), then the ECU 34 sets the flag FLG2 (present) to "1" in step S28 shown in FIG. 5.

In step S29, the ECU 34 judges whether or not a vehicle speed V (present) from the vehicle speed sensor 22 is equal to or greater than a cruise target vehicle speed Vcru. The cruise target vehicle speed Vcru is a target value for the vehicle speed V at which the vehicle 10 can cruise (cruising). The cruise target vehicle speed Vcru is set to a value exceeding the E mode upper limit value Vmax_e, e.g., the N mode upper limit value Vmax_n. The cruise target vehicle speed Vcru may not necessarily be a fixed value, but may be varied depending on a legal limit speed for the road on which the vehicle 10 is being driven. Information about the legal limit speed may be acquired from a navigation device, not shown, on the vehicle 10. Alternatively, if the vehicle speed V takes a constant value for a certain period of time, then it may be used as the cruise target vehicle speed Vcru.

If the vehicle speed V (present) is not equal to or greater than the cruise target vehicle speed Vcru (S29: NO), then the ECU 34 calculates a temporary upper vehicle speed limit value Vmax (present) (hereinafter referred to as "temporary upper vehicle speed limit value Vmax_temp (present)") depending on the accelerator opening degree $\theta p$ (present) in step S30. The relationship between the accelerator opening degree $\theta p$ and the temporary upper vehicle speed limit value Vmax_temp is stored beforehand as a map in the memory 44.

In step S31, the ECU 34 sets a numerical range (hereinafter referred to as "variable range R (present)") that can be taken by the present upper vehicle speed limit value Vmax (present) depending on an upper vehicle speed limit value Vmax (previous) in the previous processing cycle. The variable range R is set in order to prevent the motor drive force F from changing excessively greatly due to an excessively great change in the upper vehicle speed limit value Vmax, and defines an allowable change in the upper vehicle speed limit value Vmax in one processing cycle. For example, the variable range R may be given as the upper vehicle speed limit value Vmax (previous)±a1 (a1 represents a positive real number){Vmax (previous)−a1≤R (present)≤Vmax (previous)+a1}.

In step S32, the ECU 34 sets an upper vehicle speed limit value Vmax (present) based on the temporary upper vehicle speed limit value Vmax_temp (present) and a variable range R (present).

Specifically, if the temporary upper vehicle speed limit value Vmax_temp (present) falls within the variable range R (present){Vmax (previous)−a1≤Vmax_temp (present)≤Vmax (previous)+a1}, then the temporary upper vehicle speed limit value Vmax_temp (present) is used as the upper vehicle speed limit value Vmax (present){Vmax (present)←Vmax_temp (present)}.

If the temporary upper vehicle speed limit value Vmax_temp (present) is greater than the maximum value {Vmax (previous)+a1} in the variable range R (present){Vmax_temp (present)>Vmax (previous)+a1}, then the maximum value {Vmax (previous)+a1} in the variable range R (present) is used as the upper vehicle speed limit value Vmax (present) {Vmax (present)←Vmax (previous)+a1}.

If the temporary upper vehicle speed limit value Vmax_temp (present) is smaller than the minimum value {Vmax (previous)−a1} in the variable range R (present) {Vmax_temp (present)<Vmax (previous)−a1}, then the minimum value {Vmax (previous)−a1} in the variable range R (present) is used as the upper vehicle speed limit value Vmax (present) {Vmax (present)←Vmax (previous)−a1}.

Referring back to step S29, if the vehicle speed V (present) is equal to or greater than the cruise target vehicle speed Vcru (S29: YES), then the ECU 34 sets the cruise target vehicle speed Vcru to the upper vehicle speed limit value Vmax (present) in step S33. The vehicle speed V is now led to the cruise target vehicle speed Vcru. Therefore, even when the E mode is selected as the driving mode M, the driver can achieve a vehicle speed V in excess of the E mode upper limit value Vmax_e.

Referring back to step S23 in FIG. 4, if the flag FLG1 (present) is "1" and the processing is on its way to interrupting the limitation on the output of the motor 12 (S23: YES), then control goes to step S34 in FIG. 6.

In step S34 in FIG. 6, the ECU 34 sets the flag FLG2 (present) to "1" indicating that the limitation on the vehicle speed is being interrupted. In step S35, the ECU 34 judges whether or not the vehicle speed V (present) is equal to or greater than the S mode upper limit value Vmax_s. As described above, the S mode upper limit value Vmax_s is a maximum value that can be taken by the upper vehicle speed limit value Vmax in the S mode. The S mode upper limit value Vmax_s may be replaced with another value, e.g., the N mode upper limit value Vmax_n. If no specific numerical value is set as the S mode upper limit value Vmax_s, i.e., no upper limit value for the vehicle speed V is set in the S mode, then another threshold value than the S mode upper limit value Vmax_s may be provided.

If the vehicle speed V (present) is not equal to or greater than the S mode upper limit value Vmax_s (S35: NO), then the ECU 34 carries out steps S36 through S38 to set an upper vehicle speed limit value Vmax (present). Steps S36 through S38 are identical to steps S30 through S32 shown in FIG. 5. Therefore, even when the E mode is selected as the driving mode M, the driver can achieve a vehicle speed V in excess of the E mode upper limit value Vmax_e.

If the vehicle speed V (present) is equal to or greater than the S mode upper limit value Vmax_s (S35: YES), then the ECU 34 sets the S mode upper limit value Vmax_s to an upper vehicle speed limit value Vmax (present) in step S39. Therefore, even when the E mode is selected as the driving mode M, the driver can achieve a vehicle speed V in excess of the cruise target vehicle speed Vcru.

Referring back to step S22 in FIG. 4, if the flag FLG1 (present) is "2" and the limitation on the output of the motor 12 is being interrupted (S22: YES), then the ECU 34 sets the flag FLG2 to "1" indicating that the limitation on the vehicle speed is being interrupted in step S40. In step S41, the ECU 34 sets the S mode upper limit value Vmax_s to an upper vehicle speed limit value Vmax (present). Therefore, even when the E mode is selected as the driving mode M, the driver can drive the vehicle 10 at a constant speed of the S mode upper limit value Vmax_s (cruising).

In step S25 shown in FIG. 4, if the flag FLG2 (previous) is "1" and the limitation on the vehicle speed is being interrupted (S25: YES), then control goes to step S42 in FIG. 5. Control goes to S42 when the vehicle speed V has dropped to the E mode upper limit value Vmax_e after the limitation on the vehicle speed and the limitation on the output of the motor 12 have been interrupted, as shown in FIGS. 7A through 7C, for example. In addition, control also goes to S42 when the limitation on the vehicle speed has been interrupted, but the limitation on the output of the motor 12 has not been interrupted.

In step S42 in FIG. 5, the ECU 34 judges whether or not the vehicle speed V (present) is equal to or smaller than the E mode upper limit value Vmax_e. If the vehicle speed V (present) is not equal to or smaller than the E mode upper limit value Vmax_e (S42: NO), then control goes to step S28 and the ECU 34 carries out steps S28 through S33. If the vehicle speed V (present) is equal to or smaller than the E mode upper limit value Vmax_e (S42: YES), then the vehicle speed V has dropped to the E mode upper limit value Vmax_e after at least the limitation on the vehicle speed has been interrupted. Then, in step S43, the ECU 34 sets the flag FLG2 (present) to "0". In step S44, the ECU 34 sets the E mode upper limit value Vmax_e as the upper vehicle speed limit value Vmax (present). As described above, once the vehicle speed limiting control process is started, the upper vehicle speed limit value Vmax (present) is not returned to the E mode upper limit value Vmax_e until the vehicle speed V (present) becomes equal to or smaller than the E mode upper limit value Vmax_e. Therefore, even when the E mode is selected as the driving mode M, the vehicle 10 can travel at a vehicle speed V in excess of the E mode upper limit value Vmax_e. In particular, if the cruise target vehicle speed Vcru or the S mode upper limit value Vmax_s is set as the upper vehicle speed limit value Vmax (S33 in FIG. 5, S41 in FIG. 4), it is possible for the vehicle 10 to cruise at a vehicle speed V in excess of the E mode upper limit value Vmax_e.

[2-3. Calculation of Target Drive Force Ftar]

The target drive force calculating function 54 of the processor 42 of the ECU 34 calculates a target drive force Ftar for the motor 12 based on the vehicle speed V, the upper vehicle speed limit value Vmax, the acceleration ΔaV, and the driving mode M, etc. Specifically, the target drive force calculating function 54 calculates a target value for the acceleration ΔaV (present){target acceleration ΔaVtar (present)} depending on the difference between the vehicle speed V (present) and the upper vehicle speed limit value Vmax (present){hereinafter referred to as "difference D1 (present)"}. Then, the target drive force calculating function 54 multiplies the difference between the acceleration ΔaV (present) and the target acceleration ΔaVtar (present){hereinafter referred to as "difference D2 (present)} by a gain Gv (present). The gain Gv (present) is set on the basis of the vehicle speed V (present) and the driving mode M (present), and is stored as a preset map. The target drive force calculating function 54 then determines the difference between the target drive force Ftar (previous) for the motor 12 in the previous processing cycle and the product of the difference D2 (present) and the gain Gv (present){hereinafter referred to as "difference D3 (present)}. The target drive force calculating function 54 calculates a target drive force Ftar (present) based on the difference D3 (present).

[2-4. Control of Inverter 14]

The ECU 34 controls the inverter 14 based on a target torque based on the target drive force Ftar (present) determined according to the above process, the U-phase current Iu from the current sensor 26, the W-phase current Iw from the current sensor 28, and the electric angle θ from the resolver 30. A specific process of controlling the inverter 14 is disclosed in Japanese Laid-Open Patent Publication No. 2009-240125, for example. The target torque may be calculated by multiplying the target drive force Ftar (present) by the radius of a road wheel, not shown.

3. Relationship Between the Vehicle Speed V, the Motor Output Pmot, and the Accelerator Opening Degree θp FIG. 7A is a timing chart showing by way of example the vehicle speed V in a case where the motor output limiting control process and the vehicle speed limiting control process according to the present embodiment are used. FIG. 7B is a timing chart showing by way of example the motor drive force F in a case where the motor output limiting control process and the vehicle speed limiting control process according to the present embodiment are used. FIG. 7C is a timing chart showing by way of example the accelerator opening degree θp in a case where the motor output limiting control process and the vehicle speed limiting control process according to the present embodiment are used. In the examples shown in FIGS. 7A through 7C, the E mode is selected. In FIG. 7B, dotted-lines of the curve lines representing the motor drive force F shows a case where a vehicle speed limiting process for protecting the motor 12 against excessive operation is not performed (comparative example), and the case is not used in the present embodiment.

From time t0 to time t1, the accelerator opening degree θp is constant, and accordingly the motor drive force F and the vehicle speed V are also constant. At time t1, the driver starts further depressing the accelerator pedal 18, increasing the accelerator opening degree θp and hence the motor drive force F and the vehicle speed V.

At time t2, when the vehicle speed V reaches the E mode upper limit value Vmax_e, though the accelerator opening degree θp is still increasing, the motor drive force F decreases, and the vehicle 10 starts to be driven at a constant speed (cruising).

At time t3, when the accelerator opening degree θp becomes equal to or greater than the vehicle speed limitation interrupting threshold value THθp1 (S24 in FIG. 4: YES), the limitation on the vehicle speed (vehicle speed limiting control process) for keeping the vehicle speed V equal to or smaller than the E mode upper limit value Vmax_e is interrupted, and the upper vehicle speed limit value Vmax gradually increases.

At time t4, the vehicle speed V reaches the cruise target vehicle speed Vcru, and the accelerator opening degree θp ends increasing.

At time t5, the driver further depresses the accelerator pedal 18 until the accelerator opening degree θp reaches the output limitation interrupting threshold value THθp2 (=WOT) (S3 in FIG. 2: YES), whereupon the limitation on the output of the motor 12 starts to be interrupted, increasing the motor drive force F as well as the upper vehicle speed limit value Vmax.

At time t6, when the limitation on the output of the motor 12 is finalized (S7 in FIG. 2: YES, S22 in FIG. 4: YES), the S mode upper limit value Vmax_s is set as the upper vehicle speed limit value Vmax (S41). At time t7, the motor drive force F reaches the S mode upper limit value Fmax_s. After time t8, for protecting the motor 12 against excessive operation, the motor drive force F is lowered to a value required to drive the vehicle 10 at a constant speed.

At time t9, the driver releases the accelerator pedal 18, allowing the accelerator opening degree θp to start decreasing. However, since the ECU 34 has already limited the motor drive force F, the motor drive force F remains constant.

At time t10, when the accelerator opening degree θp reaches the output limitation resuming threshold value THθp3, counting for the resumption of the limitation on the output of the motor 12 is started (S12 in FIG. 3: YES). At time t11, the resumption of the limitation on the output of the motor 12 is finalized (S16: YES). Accordingly, the motor drive force F, the vehicle speed V, and the upper vehicle speed limit value Vmax start to be reduced from time t11 (S18).

At time t12, the motor drive force F is lowered to a value for realizing the cruise target vehicle speed Vcru. At time t13, the vehicle speed V is reduced to the cruise target vehicle speed Vcru.

At time t14, the accelerator opening degree θp is further lowered. Subsequently, the vehicle speed V is lowered to the E mode upper limit value Vmax_e at time t15 (S42 in FIG. 5: YES). Then, the upper vehicle speed limit value Vmax returns to the E mode upper limit value Vmax_e (S44).

4. Advantages of the Present Embodiment

According to the present embodiment, as described above, while the vehicle 10 is being driven in the E mode (second driving mode) with reduced electric power consumption, when the driver depresses the accelerator pedal 18 (input device) to keep the accelerator opening degree θp equal to or greater than the threshold value THθp2, i.e., when the driver enters a request to interrupt the limitation, the motor output limiting control process (output limiting control process) is interrupted while continuing the E mode (t6 in FIGS. 7A through 7C). Therefore, even if a request is made to interrupt the limitation of the output of the motor 12 (driving electric motor) (motor output limitation), it is possible to continue the E mode, but not to change to the N mode or the S mode (first driving mode). Consequently, when interruption of the limitation on the output of the motor 12 becomes unnecessary after the request, it is not necessary to reset the driving mode M to the E mode. As a result, it is possible for the driver to avoid the trouble of having to switch the driving mode M to the E mode again after the limitation on the output of the motor 12 has been interrupted, compared with an arrangement, for example, wherein the driver manually switches from the E mode to the N mode or the S mode and then manually switches from the N mode or the S mode back to the E mode in response to a request for limiting the output of the motor 12.

Furthermore, it is possible to dispense with the control process for switching between the driving modes in response to a request for the limitation on the output of the motor 12 and to prevent the electric power consumption from increasing due to use of the N mode or the S mode or to prevent the processing load from increasing due to the switching between the driving modes, compared with an arrangement wherein the driving mode automatically switches from the E mode to the N mode or the S mode and then automatically switches from the N mode or the S mode back to the E mode in response to a request for limiting the output of the motor 12.

According to the above embodiment, in the E mode, the vehicle speed limiting process for limiting the vehicle speed V of the vehicle 10, i.e., the upper vehicle speed limit value setting control process, etc. shown in FIGS. 4 through 6, is carried out as well as the motor output limiting control process. While the vehicle 10 is traveling in the E mode, when the accelerator opening degree θp continues to be equal to or greater than the threshold value THθp2, i.e., when the driver enters a limitation interrupting request through the accelerator pedal 18, both the output limiting control process and the vehicle speed limiting process are interrupted while the E mode is being continued (t6 in FIGS. 7A through 7C). Since both the limitation on the output of the motor 12 and the limitation on the upper vehicle speed limit value Vmax are interrupted, it is possible to respond more appropriately to the request from the driver, i.e., the operation of the accelerator pedal 18.

According to the present embodiment, when the accelerator opening degree θp continues to be equal to or smaller than the threshold value THθp3, i.e., when the driver stops entering the limitation interrupting request through the accelerator pedal 18, after both the output limiting control process and the vehicle speed limiting process have been interrupted while the E mode is being continued (S16 in FIG. 3: YES), the vehicle speed limiting process continues to be interrupted, whereas the motor output limiting control process is resumed (see t11 in FIGS. 7A through 7C). Consequently, even after the driver has stopped entering the limitation interrupting request, the vehicle speed limiting process continues to be interrupted. Therefore, the vehicle 10 can be driven at a vehicle speed equal to or higher than the upper vehicle speed limit value Vmax according to the vehicle speed limiting control process in the E mode.

According to the present embodiment, when the vehicle speed V becomes equal to or smaller than the E mode upper limit value Vmax_e after the vehicle speed limiting process has continued to be interrupted and the output limiting control process has been resumed, the vehicle speed limiting process is resumed (t11 through t15 in FIGS. 7A through 7C and S42 in FIG. 5: YES). It is thus possible to resume the E mode coupled with the limitation on the output of the motor 12 and the limitation on the vehicle speed without manually switching between the driving modes or automatically switching between the driving modes.

According to the present embodiment, the output limiting control process is interrupted after the vehicle speed limiting control process has been interrupted (see t4 through t6 in FIGS. 7A through 7C). With the above configuration, since the vehicle speed limiting control process is interrupted before the output limiting control process is interrupted, it is possible to increase the vehicle speed V quickly until the output limiting control process is interrupted, after the vehicle speed limiting control process has been interrupted. Therefore, when the output limiting control process is interrupted, it is possible for the vehicle speed V to change smoothly to a vehicle speed V in excess of the E mode upper limit value Vmax_e.

5. Modifications

The present invention is not limited to the above embodiment, but may employ various arrangements based on the disclosure of the description thereof. For example, the present invention may employ the following arrangements:

[5-1. Objects to which the Invention is Applicable]

In the above embodiment, the vehicle 10 having the single motor 12 and the single battery 16 has been described. The present invention is also applicable to other objects. For example, the present invention may be applied to an electric vehicle having a driving motor and a regenerative motor separately. Alternatively, the present invention may be applied to a hybrid vehicle (electric vehicle) having an engine in addition to the motor 12. The present invention may also be applied to a fuel cell vehicle (electric vehicle) having fuel cells in addition to the motor 12 and the battery 16. Further alternatively, the present invention may be applied to not only the electric vehicle 10, but also another mobile object, e.g., a ship or an aircraft, having a plurality of driving modes.

[5-2. Driving Modes]

In the above embodiment, the three driving modes are provided, i.e., the N mode, the E mode, and the S mode. However, the present invention is not limited to the above, insofar as there are provided two or more driving modes with different degrees of limitation on the power of the vehicle 10. For example, the present invention may employ only the N mode and the E mode, or may employ, in addition to the N mode, the E mode, and the S mode or instead of either one of the N mode, the E mode, and the S mode, another driving mode, e.g., either one of the race mode and the snow mode disclosed in JP 2007-302055 A.

In the above embodiment, the driver manually switches between the driving modes using the mode changer switch 32. However, the driving modes may be switched automatically. For example, in a case where the N mode or the S mode has been selected, the driving mode may be switch automatically to the E mode if the remaining energy level (SOC) of the battery 16 becomes lower than a predetermined threshold value and hence is low.

[5-3. The Output Limiting Control Process and the Vehicle Speed Limiting Control Process (the Upper Vehicle Speed Limit Value Setting Control Process)]

In the above embodiment, the output limiting control process and the vehicle speed limiting control process (the upper vehicle speed limit value setting control process) in the selected E mode have been described. However, the same control processes can be performed while another driving mode is being selected.

In the above embodiment, the vehicle speed limiting control process is interrupted before the output limiting control process is interrupted, and the vehicle speed limiting control process is resumed after the output limiting control process has been resumed (see t4 through t15 in FIGS. 7A through 7C). However, the timings of the interruption of these control processes are not limited to the above timings. For example, the control processes may be interrupted at the same time.

FIGS. 8 and 9 are first and second flowcharts, respectively, of a motor output limiting control process and a vehicle speed limiting control process (upper vehicle speed limit value setting control process) according to a modification. FIG. 10A is a timing chart showing by way of example the vehicle speed V in a case where the motor output limiting control process and the vehicle speed limiting control process according to the modification are used. FIG. 10B is a timing chart showing by way of example the motor drive force F in a case where the motor output limiting control process and the vehicle speed limiting control process according to the modification are used. FIG. 10C is a timing chart showing by way of example the accelerator opening degree θp in a case where the motor output limiting control process and the vehicle speed limiting control process according to the modification are used.

In step S51 shown in FIG. 8, the ECU 34 judges whether the driving mode M is the E mode or not based on an output signal from the mode changer switch 32. If the driving mode M is not the E mode (S51: NO), then the sequence of the present processing cycle is ended. In other words, if the driving mode M is the N mode or the S mode, then the upper drive force limit value Fmax for the motor and the upper vehicle speed limit value Vmax are controlled according to a process different from the E mode.

If the driving mode M is the E mode (S51: YES), then the ECU 34 judges in step S52 whether the limitation on the output of the motor 12 and the limitation on the vehicle speed V are being interrupted or not by judging whether a flag FLG11 (previous) in the previous processing cycle is "1" or not. The flag FLG11 represents a performance state of both the limitations in the E mode. If the flag FLG11 is "0", then it indicates that both the limitations are not being interrupted. If the flag FLG11 is "1", then it indicates that both the limitations are being interrupted.

In step S52, if the flag FLG11 (previous) is not "1" and the limitation on the output of the motor 12 and the limitation on the vehicle speed V are not being interrupted (S52: NO), then the ECU 34 judges whether there is a request from the driver of the vehicle 10 for interrupting both the limitations or not in step S53. Specifically, the ECU 34 judges whether or not the accelerator opening degree θp (present) is equal to or greater than a threshold value for judging whether there is a request from the driver of the vehicle 10 for interrupting both the limitations or not (hereinafter referred to as "limitation interrupting threshold value THθp11" or "threshold value THθp11"). In the present embodiment, the threshold value THθp11 represents a fully-open throttle state (WOT: Wide Open Throttle).

If the accelerator opening degree θp (present) is not equal to or greater than the threshold value THθp11 (S53: NO), then the accelerator pedal 18 has not been depressed to a fully-open state and there has not been given a request from the driver of the vehicle 10 for interrupting both the limitations. Control then goes to step S56. If the accelerator opening degree θp (present) is equal to or greater than the threshold value THθp11 (see time t23 in FIG. 10C) (S53: YES), then the driver has depressed the accelerator pedal 18 and there has been given a request from the driver of the vehicle 10 for interrupting both the limitations. Control then goes to step S54.

In step S54, the ECU 34 sets the sum of a count value C11 (previous) and 1 as a count value C11 (present). The count value C11 is a value for judging the finalization of the interrupting request. In step S55, the ECU 34 judges whether the interrupting request is finalized or not based on whether or not the count value C11 (present) is equal to or greater than a threshold value for finalizing the interrupting request (hereinafter referred to as "interruption judging threshold value THc11" or "threshold value THc11").

If there has not been given a request for interrupting both the limitations in step S53 (S53: NO) or if the count value C11 (present) is not equal to or greater than the threshold value THc11 and the interrupting request is not finalized (S55: NO), then the ECU 34 sets the flag FLG11 (present) to "0" in step S56. In step S57, the ECU 34 continues the limitation on the output of the motor 12 and the limitation on the vehicle speed V, and does not interrupt both the limitations. As a result, the motor drive force F is controlled to be equal to or smaller than the E mode upper limit value Fmax_e, and the vehicle speed V is controlled to be equal to or smaller than the E mode upper limit value Vmax_e.

In step S55, if the count value C11 (present) is equal to or greater than the threshold value THc11 and the interrupting request is finalized (S55: YES), then the ECU sets the flag FLG11 (present) to "1" in step S58. In step S59, the ECU 34 interrupts the limitation on the output of the motor 12 and the limitation on the vehicle speed V, and does not perform both the limitations. As a result, the motor drive force F can exceed the E mode upper limit value Fmax_e, and the vehicle speed V can exceed the E mode upper limit value Vmax_e.

In the above embodiment, the output limiting control process and the vehicle speed limiting control process (the upper vehicle speed limit value setting control process) are used in combination. However, only either one of these control processes may be performed.

The invention claimed is:

1. An electric vehicle comprising:
    an electronic control unit having a first driving mode for performing no limitation on a power performance of the electric vehicle or performing a predetermined limitation on the power performance and a second driving mode for performing a greater limitation on the power performance than the first driving mode thereby to make electric power consumption smaller than the first driving mode; and
    a mode changer switch that switches between the first driving mode and the second driving mode,
    wherein the electronic control unit is configured to:
    perform both of an output limiting control process for limiting an output of a driving electric motor and a vehicle speed limiting control process for limiting a vehicle speed of the electric vehicle when the mode changer switch selects second driving mode;
    judge whether a driver of the electric vehicle enters a limitation interrupting request into an input device or not;
    interrupt both of the output limiting control process and the vehicle speed limiting control process if the driver enters the limitation interrupting request into the input device even when the mode changer switch selects the second driving mode; and
    resume the output limiting control process while continuing to interrupt the vehicle speed limiting control process if the driver stops entering the limitation interrupting request into the input device while the mode changer switch continues selecting the second driving mode.

2. The electric vehicle according to claim 1, wherein the electric vehicle is characterized by:
    resuming the vehicle speed limiting control process if the vehicle speed becomes equal to or smaller than an upper vehicle speed limit value of the second driving mode after having resumed the output limiting control process while continuing to interrupt the vehicle speed limiting control process, the upper vehicle speed limit value being used in the vehicle speed limiting control process.

3. The electric vehicle according to claim 1, wherein the electric vehicle is characterized by:
    interrupting the output limiting control process after having interrupted the vehicle speed limiting control process.

4. The electric vehicle according to claim 1, wherein the electric vehicle is characterized by:
    judging that the limitation interrupting request has been entered if an accelerator opening degree exceeds a preset output limitation interrupting threshold value.

\* \* \* \* \*